Dec. 22, 1953     J. MASI     2,663,109

FISHING LINE ATTACHMENT

Filed April 19, 1952

INVENTOR.
JOHN MASI.
BY
Salvatore G Militano
ATTORNEY.

Patented Dec. 22, 1953

2,663,109

UNITED STATES PATENT OFFICE 2,663,109

FISHING LINE ATTACHMENT

John Masi, Miami, Fla.

Application April 19, 1952, Serial No. 283,179

2 Claims. (Cl. 43—15)

This invention relates generally to a device for catching fish and is more particularly directed to a spring loaded device attachable to a fish hook carrying line wherein a pull on the baited hook by a fish attempting to take the bait will cause a release of the spring pressure and a consequent quick jerk of the hook to impale the fish.

It is a principal object of the present invention to provide an attachment for a fishing line for automatically jerking the baited hook at the precise moment that a fish begins to take the bait.

A further object of the present invention is to provide a spring loaded device for a fishing line provided with means for attaching the sinker carrying line in alignment with the line extending from a pole or reel, and with further means for attaching the hook carrying line whereby the spring is released when a fish jerks the baited hook causing the hook to impale the fish.

A still further object of the present invention is to provide a spring loaded device for a fishing line for the automatic hooking of fish wherein the device provides for the attachment of the sinker in such a manner that it is not prematurely unset while in the act of being cast.

With these and other objects in view, the invention will be best understood from a consideration of the following detail description taken in connection with the accompanying drawings, forming a part of the present specification with the understanding, however, that the invention is not confined to any strict conformity with the showing of the drawings, but may be changed or modified so long as such changes or modifications mark no material departure from the salient features of the invention as expressed in the appended claims.

Figure 1:
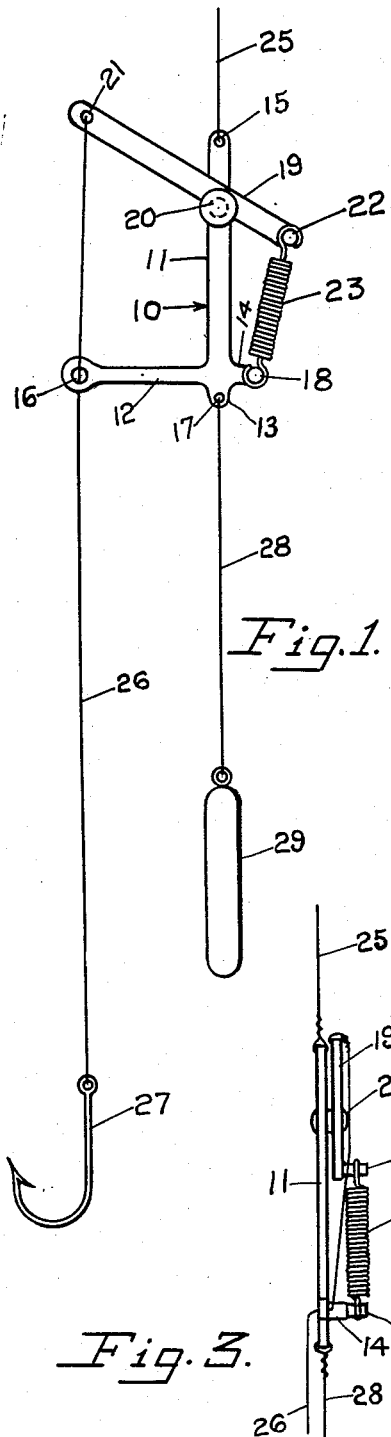
Figure 1 is a front elevational view of a fishing line attachment embodying my invention with the spring shown in a normal or unloaded condition.
Figure 3:
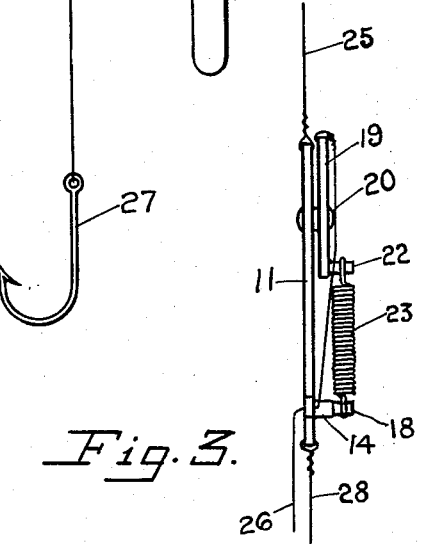
Figure 3 is an end view of Fig. 1 with the sinker and hook not shown.

Referring now to the drawings wherein similar numerals refer to like parts throughout the several views, the numeral 10 designates generally a base member having an L-shape and consisting of an elongated support arm 11, and a second elongated arm or member 12 secured at one end to the lower portion of the arm 11 and extending at substantially right angle to it. At the juncture of members 11 and 12 there are a pair of relatively short arms 13 and 14 secured thereto extending in longitudinal alignment with, but in the opposite direction of the arms 11 and 12, respectively. The free ends of the arms 11, 12 and 13 contain a line receiving bore 15, 16 and 17 respectively, while at the free end portion of arm 14 which is bent slightly outwardly (see Fig. 3) there is a pin 18 secured thereon. A lever 19 is pivotally mounted on a pivot pin 20 secured adjacent the upper portion of the member 11. A bore 21 is contained at one end of the lever 19 which bore is in substantially vertical alignment with the bore 16 of the member 12 when the lever 19 is in its unlocked position (see Fig. 1) while at the other end of the lever 19 there is a pin 22 secured thereto, which pin 22 receives one end of a coil spring 23 whose other end is received by the pin 18. A fishing line 25, which is held by a person fishing, has its other end secured to the bore 15 of the member 11. A line 26 connected to a fish hook 27 is threaded through the bore 16 of the arm 12 and secured to the bore 21 of the lever arm 19, while a sinker line 28 secured to a sinker 29 at one end has its other end secured to the bore 17 of the arm 13. It is to be noted that the bores 15 and 17 are in alignment with each other as are likewise the lines 25 and 28. This arrangement prevents any force exerted by the sinker 29 in the casting process from being transmitted other than to the line 25.

Figure 2:
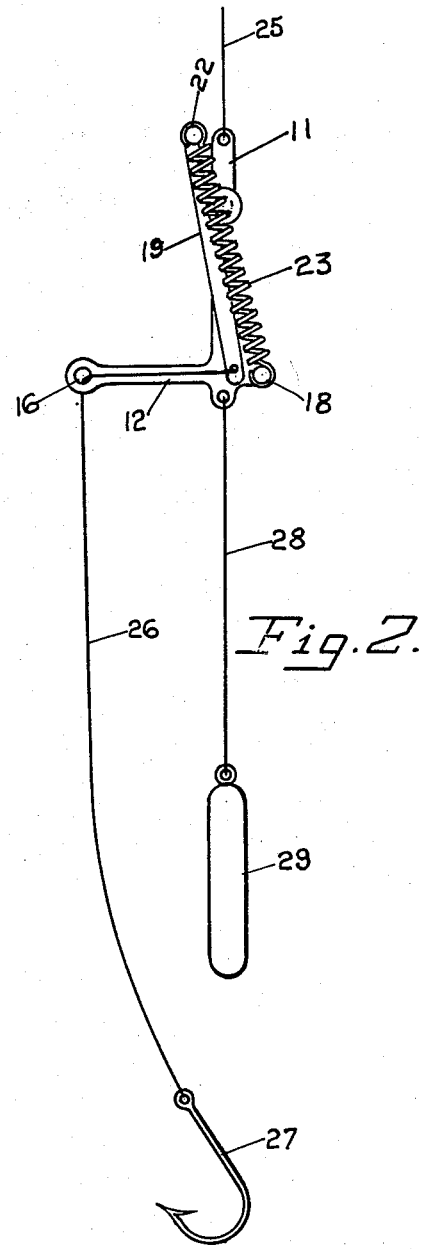
Figure 2 is a view similar to Fig. 1 with the spring in its loaded or set condition.

In the normal operation of the device, the lever 19 is caused to be pivoted about the pivot pin 20 against the spring pressure of the spring 23 until it passes dead center and is in the position shown by Fig. 2 with the pin 18 acting as a stop for the lever 19. Upon baiting the hook 27, the device is either cast or thrown into the water and any force exerted by the momentum of the travelling sinker 29 is transmitted along the line 28, the elongated member 11 and the line 25. Since none of this force affects the setting of the lever 19, once the device is set, it will remain so without prematurely becoming sprung or unset. As a fish takes the bait, it pulls on the hook 27 and line 26 causing the lever arm 19 to swing about its pivot 20 until the spring 23 passes over and just beyond the pivot pin 20 when the spring pressure becomes released and the lever 19 is caused to rotate to its normal or unsprung position in a very quick motion effecting a jerking action to the line 26 and the hook 27 to impale the fish.

Having now disclosed by invention and realizing, that, in view of my disclosure many modifications in details and construction or design will readily occur to those skilled in the art, I do not choose to limit myself except as in the appended claims.

What I claim as new is:

1. A device of the class described comprising an elongated member having means at each end thereof for securing lines thereto, a second elongated member pivotally mounted on the upper portion of said first member and having means contained at one end thereof for securing a further line thereto, third and fourth members mounted adjacent the lower portion of said first member and extending in alignment with each other, the free end of said third member having a bore thereon adapted to receive said last mentioned line therethrough, a spring means connecting the free end of said fourth member and the other end of said second elongated member, and stop means mounted at the free end of said fourth member for arresting the pivotal movement of said second elongated member.

2. A device of the class described comprising a pair of elongated members mounted together adjacent one end of each of said members forming a pair of extended arms and a pair of relatively short arms, the free end of each of said extended arms and one of said short arms having a bore, a member pivotally mounted on one of said extended arms, said pivoted member having a bore at one end thereof, spring means connecting the other end of said pivoted member and the other of said short arms, and stop means mounted on said last named short arm.

JOHN MASI.

References Cited in the file of this patent

UNITED STATES PATENTS

| Number | Name | Date |
| --- | --- | --- |
| 422,331 | Bradford | Feb. 25, 1890 |
| 1,859,944 | Waitt | May 24, 1932 |
| 2,231,616 | Costantino | Feb. 11, 1941 |

FOREIGN PATENTS

| Number | Country | Date |
| --- | --- | --- |
| 37,236 | Norway | June 25, 1923 |